Aug. 14, 1956  C. W. CLEMENTS ET AL  2,758,469
CALIBRATING APPARATUS
Filed March 22, 1952
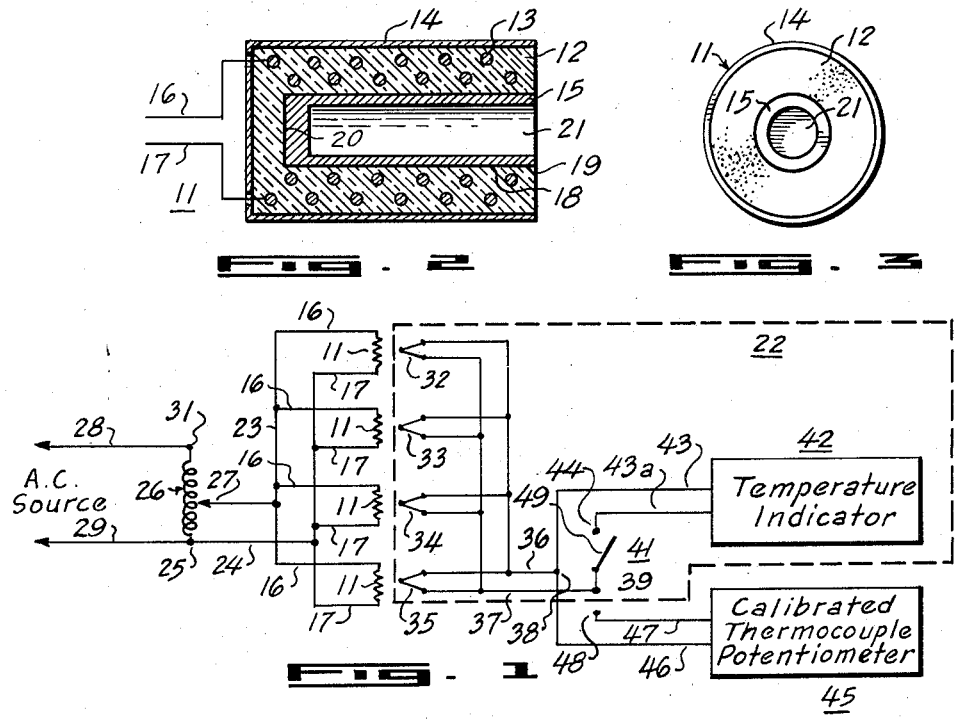
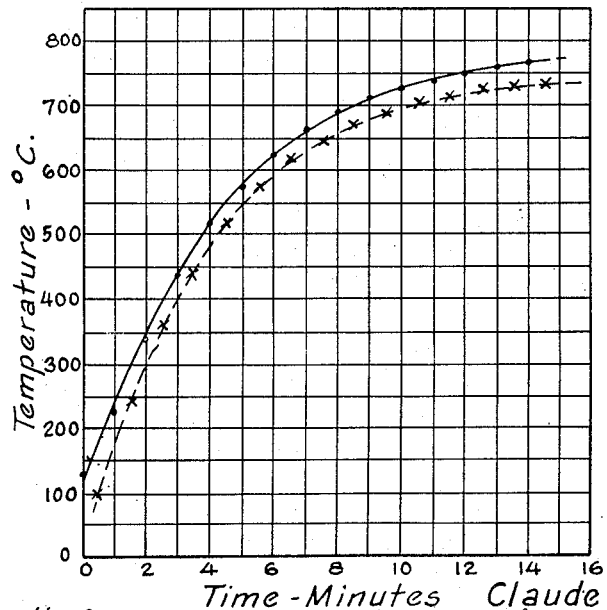
Code:
—•— Cal. Reading
—*— Airp. Indicating Instrument
INVENTORS!
Claude W. Clements
BY & Wayne P. Fanyo
ATTORNEY United States Patent Office 2,758,469
Patented Aug. 14, 1956

2,758,469

CALIBRATING APPARATUS

Claude W. Clements, Fort Worth, Tex., and Wayne P. Fanyo, Riverside, Calif., assignors, by mesne assignments, to General Dynamics Corporation, a corporation of Delaware Application March 22, 1952, Serial No. 278,074

9 Claims. (Cl. 73—1)

This invention relates to testing and calibrating apparatus, and more particularly to apparatus for testing and calibrating temperature indicators and instruments.

Safe and reliable operation of modern aircraft and their power plants is absolutely dependent upon the use of instruments. Among the numerous physical quantities measured and indicated in an aircraft, temperature, at various locations within the aircraft and its power plant, is one of the more important and accuracy of determination is a requisite. In the case of internal combustion engines, temperature instruments serve to warn the pilot of engine overheating or may be utilized to indicate to the pilot or mechanic while warming up the engine on the ground when the engine has warmed sufficiently for the take-off and flight. Thermometers are additionally utilized to measure and indicate the temperature of the engine lubricating oil, the carburetor mixture, and the air inside and outside of the cockpit and cabin. Where jet reaction propulsion units are employed in an aircraft, in addition to the desirability of measuring and indicating certain of the same above-mentioned temperatures, an accurate determination of jet tail pipe temperature is demanded. For such purpose, the method most commonly used is that which embodies a thermocouple system having inter alia four chromel-alumel thermocouples, which after study and development to adapt them to a particular type of engine, are permanently located in the tail pipe and extend into the jet stream.

The operation of a thermocouple, as is well known to those skilled in the art, depends upon the phenomenon that when two dissimilar wires are joined together to form a junction and the junction is heated, an electromotive force will be generated at the opposite ends of the two wires. In jet reaction engine applications for the determination of jet tail pipe temperature, the aforementioned chromel-alumel thermocouples are generally placed substantially in the same plane and spaced essentially equidistant around the circumference of the tail pipe. The four thermocouples are preferably connected in parallel and the parallel combination is interconnected by a pair of leads with a millivoltmeter which is located in the pilot's compartment. The indications exhibited by the millivoltmeter are substantially directly proportional to the temperature difference between the hot junction of the thermocouple and the cold junction, which is located at the terminals of the millivoltmeter. However, readings are affected by the resistance of the leads. Although the development of inaccuracies from this cause may be minimized by selecting a millivoltmeter with a high internal resistance, inaccuracies do arise and in order to maintain the highest possible standard of perfection in these instruments, inspections and calibrations are demanded at regular intervals.

Heretofore, it had been the generally arcepted procedure in the periodic inspection and calibration of the aforementioned instrument actually to start the jet engines and operate them as if they were in flight. This was considered essential in order to provide the heat required to calibrate the thermocouple system. This method was unsatisfactory in that it was expensive because of the large quantities of fuel which were necessarily consumed, and also because of the time involved in carrying out the tests. Additional personnel obviously are required to conduct such tests and considerable wear is placed on the engines for no purpose other than to afford heat to the thermocouples.

It is, therefore, an object of this invention to provide means for inspecting and accurately calibrating aircraft jet engine thermocouple temperature indicating instruments without operation of the engine.

Another object of this invention is to provide a simplified means for rapidly and accurately calibrating jet engine thermocouple temperature instruments throughout the entire range of operation of the instrument.

A further object of this invention is to provide means for realizing more accurate calibration of jet engine temperature instruments.

Other objects and features of this invention will be readily apparent to those skilled in the art from the following specification and appended drawings in which:

Figure 1 is a schematic diagram of a circuit, in accordance with the present invention, for testing and calibrating engine thermocouple temperature indicators, Figure 2 is a sectional view showing the construction of a thermocouple heater, Figure 3 is an end view of the thermocouple heater; and Figure 4 is a graph showing temperature readings versus time for both calibrated standard and the temperature indicator.

Referring now to Figure 2, a thermocouple heating element 11 is illustrated which includes an insulating form 12, a high resistance heating winding 13, a cover 14, a heat conductive bushing 15, and a pair of input leads 16 and 17. The configuration of the insulating form 12 is essentially tubular or cup-shaped, having but one end open. The insulating form 12 is molded or otherwise fabricated from an electrically non-conductive material and preferably from a refractory type material, such as a ceramic, which is capable of withstanding the temperatures involved as well as affording the desired electrical insulation. The particular design assumed by the high resistance heating winding 13 forms no part of the present invention. It is well known in the art of electrical resistance heating that the choice of resistance materials, the proper length, the cross section of the wire, and the surface area of the winding is controlled by the amount of the heat required and the rate at which it must be delivered. The high resistance heating winding 13 is here illustrated as wound to form a helical coil with the necessary electrical insulation between the successive turns provided by suitable spacing between successive turns of the heating winding 13. In the process of fabrication the insulating form 12 is preferably molded about the high resistance heating winding 13, thereby imbedding said winding in the ceramic insulating form 12. Internal wall surfaces 18 of the insulating form 12 define a circular cavity 19 which is essentially coaxial with the longitudinal axis of the insulating form 12 and which cavity terminates at a base 20. The cover 14 is preferably constructed from a non-corrosive material such as stainless steel, which will likewise withstand the temperatures to which the heating element 11 is designed. As shown by the drawings, the cover 14 is a thin-walled tubular part open at one end to permit the insertion of the insulating form 12. The diameter of the opening of cover 14 is such as to provide a snug sliding fit of the internal wall surfaces thereof with the external wall surfaces of the insulating form 12. One end of each of the insulated input leads 16 and 17 is suitably connected to the high resistance winding 13 as by soldering. The leads are extended to the exterior through suitable openings afforded in the closed end of cover 14. For ease of construction the leads 16 and 17 may be connected to winding 13 before it is embedded in ceramic. This will save drilling of openings through the ceramic and a tedious connecting job thereafter. Heat conductive bushing 15 is of hollow cylindrical shape open at one end and closed at the other, and adapted to accommodate a thermocouple within its bore 21. Bushing 15 is formed of copper or of any other material which possesses a high thermal conduction coefficient. Its length is the same as that of cavity 19 of insulating form 12 which receives it and its circumferential dimension is such as to permit a push fit therewithin. With the insulating form 12, the high resistance heating winding 13, the cover 14, and the heat conductive bushing 15, assembled in the manner indicated and as shown in Figure 2 and with the input leads 16 and 17 conductively connected to the high resistance heating winding 13 a small and efficient heating element for thermocouples is thereby realized.

In Figure 1 there is illustrated the circuitry involved in the testing of the usual four thermocouple temperature measuring and indicating system of an aircraft. The latter system is set off in the circuitry by broken lines and is identified generally by the numeral 22. It will be hereinafter discussed in full detail. For testing the system 22 there is provided four heating elements 11, of the nature hereinbefore described, connected in parallel through interconnection of the input leads 16 and 17 of each element 11 respectively to leads 23 and 24. Lead 24 is coupled to one side of an auto-transformer 26 at terminal 25, and lead 23 is conductively connected to variable tap 27 of auto-transformer 26. Input leads 28 and 29 are connected respectively to terminals 31 and 25 which are in electrical circuit with auto-transformer 26. If an alternating voltage from a usual alternating circuit power source (not shown) is impressed across input leads 28 and 29 of the auto-transformer 26 a magnetizing current will flow in the winding thereof setting up an alternating flux which will link each turn and induce therein an alternating voltage. The alternating voltage between the terminal 25 and the variable tap 27 is proportional to the number of turns between these two points; thus any ratio of voltages may be obtained by altering the position of the variable tap 27. The present invention is understood as not being restricted to any particular form of auto-transformer as any one of a number of readily commercially available auto-transformers may be used herein, such as the General Radio Variac Type V-10. With the input leads 28 and 29 connected to a suitable source of alternating current power, it becomes apparent that the current supplied to the parallel connected heating elements 11 may be accurately controlled and rapidly and conveniently varied by manual adjustments of the variable tap 27.

Temperature measuring and indicating system 22 which is embodied in the aircraft comprises four thermocouples 32, 33, 34 and 35, each embodying the usual two dissimilar wires, one of which is preferably chromel and the other alumel. Chromel-alumel thermocouples are preferred for use with jet engines because of their ability to perform effectively at high temperatures. The present invention is not limited to any particular number of thermocouples and as many thermocouples may be employed as are required to assure that the desired temperature information will be obtained.

The four thermocouples 32, 33, 34 and 35 are connected in parallel by interconnecting their negative leads together and their positive leads together. The common positive and negative terminals resulting therefrom are conductively connected through a pair of chromel-alumel conductors 36 and 37 to contacts 38 and 39 of a usual single pole double throw switch 41, which may be conveniently located in the aircraft. System 22 also includes a conventional temperature indicator 42 which is located in the pilot's compartment in a position to be easily read. A thermocouple lead 43 interconnects the positive terminal of indicator 42 and contact 38 of switch 41. A second thermocouple lead 43a completes the circuit from switch 41 to indicator 42 having one end connected to contact 44 of switch 41 and its other end connected to the negative terminal of indicator 42.

At the time that it is desired to test the thermocouple system 22 embodied in the airplane, a standard calibrated thermocouple potentiometer 45 is electrically coupled to switch 41 with a lead 46 interconnecting its positive terminal post and contact 38 of switch 41 and a second lead 47 affording a connection between its negative terminal post and a contact 48 of switch 41.

A movable contact arm 49 is provided in the switch 41 in circuit with its contact 39. From the circuit connections hereinbefore described it becomes apparent that the electromotive force developed by the thermocouples 32—35 may be applied either to the temperature indicator 42 or the calibrated thermocouple potentiometer 45, as desired, by manipulation of contact arm 49. The calibrated potentiometer 45 serves to measure the thermocouple voltage by balancing a known battery voltage against it, the potentiometer includes a battery (not shown) which provides the voltage for this purpose. No current flows in the thermocouples 32—35 or the lead wires 36, 37, 46 or 47, and hence their resistance does not affect the readings.

The aforementioned auto-transformer 26 and the calibrated thermocouple potentiometer 45 may if desired, be located in a small, compact portable test case which may be conveniently moved from airplane to airplane. Any suitable provisions may be made within the portable test set for storage of the heating elements 11 and their associated electrical connections.

In the carrying out of a calibration operation, the individual thermocouples and their circuit connections are first tested to determine if faults exist therein. In accomplishing this the leads 28 and 29 of the auto-transformer 26 are connected to their source of alternating current power and the variable tap 27 is manually adjusted to a position which will cause the heater elements 11 to be heated by the current to an elevated temperature, which temperature may be of the order of 500° C. to assure that the thermocouples and the circuit connections will withstand a high temperature. The movable contact arm 49 of switch 41 is moved into engagement with contact 44 of the switch 41 to place the aircraft's temperature indicator 42 in circuit with the four thermocouples 32—35. After the heating elements 11 have been heated to the desired temperature, which may be determined by use of any suitable thermometer or temperature measuring means, one of the heating elements 11 is placed over one of the thermocouples of system 22, the thermocouple fitting within bore 21 of heater 11. Now, if the temperature indicator 42 fails to register a temperature rise it is obvious immediately that the thermocouple or its associated leads are defective, it being assumed that the temperature indicator 42 is functioning properly. The other thermocouples are then individually tested in the same manner. These tests thus serve to eliminate a possible source of calibration error. Now, after being assured that the thermocouples 32—35 are functioning properly and that the thermocouple leads 36, 37, 43 and 43a are correctly connected each of the thermocouples 32—35 is then fitted with a heating element 11 and the element suitably firmly affixed in place as by means of a set screw or other fastening or clamping means so that each thermocouple is fixed within the bore 21 of a corresponding heating element 11. During this step the heater elements 11 and thermocouples 32—35 should be at ambient (air) temperature. After the heater elements 11 are in place they are again connected to their source of power and the variable tap 27 of the auto-transformer 26 is next adjusted to a position which will produce in the thermocouples 32—35 a temperature at the lower end of a desired calibration range. This range may be of any desired extent. It has been found that in jet engine usage a range extending from about 125° C., which is a temperature considerably below the safe operating temperature of the jet engine, to a temperature in excess of 700° C., which is above the safe operating temperature, would afford assurance that the thermocouple system was satisfactory.

After the tap 27 of the auto-transformer 26 has been adjusted to produce a temperature of about 125° C. in the heater elements 11 the movable contact arm 49 of switch 41 is engaged with contact 48 to place the calibrated thermocouple potentiometer 45 in circuit with the thermocouples 32—35. After the temperature at the thermocouples has reached equilibrium, indicated by the reading on the potentiometer 45, the variable tap 27 of the auto-transformer 26 is moved to its maximum high voltage limit, and the reading on the potentiometer 45 is noted on the chart at reference time zero. The movable contact arm 49 of switch 41 is moved to contact 44 to connect the thermocouple system output to the ship's temperature indicator 42 and at reference time zero plus 30 seconds the temperature reading on the indicator 42 is noted. Thereafter the movable contact arm 49 is returned into engagement with contact 48 and the reading of the temperature on the potentiomter 45 at reference time zero plus one minute is noted on the chart. Switch 41 is then operated to connect the temperature indicator 42 into circuit and thirty seconds after the last reading taken on the potentiometer 45 the reading on temperature indicator 42 is noted. This taking of temperature readings alternately on the calibrated potentiometer 45 and temperature indicator 42, as the increasing heat in heater elements 11 continues to drive the temperature of the thermocouples upwardly, is continued at the predetermined time intervals until the highest desired temperature to which the temperature indicator 42 will be calibrated is indicated on the potentiometer 45 or until consecutive readings indicate that there will be little further increase in temperature. Thus the operation of calibration consists simply of taking alternate readings, as the temperature of the thermocouples rise, on the potentiometer 45 and the ship's temperature indicator 42, the readings at the potentiometer 45 being made at reference time zero and at each subsequent minute, and the readings at the ship's temperature indicator 42 being made at reference time plus 30 seconds and at each subsequent minute. All readings are made with a conventional stop-watch or other timing device. The predetermined time interval between readings is arbitrarily selected, it is an interval which affords an observer sufficient time to enter readings, and is one which will permit a sufficient number of readings to assure accuracy of the test. Normally the observer positioned at the jet engine will operate the stop-watch, control the switch 41, normally located in a junction box at the jet engine, read the potentiometer 45, inform the observer in the pilot's compartment by interphone when he should take a reading of the ship's indicator 42, and record both sets of readings.

The readings obtained may be plotted on graph paper so that disagreements between the ship's indicator 42 and the potentiometer 45 will be readily detected. The temperature data from the temperature indicator 42 and the calibrated potentiometer 45, which has been obtained from the above described procedure, may be graphically exhibited as a function of time as shown by the chart in Figure 4. The calibration temperatures noted on the chart will include not only the actual temperatures encountered by the jet propulsion unit tail pipe, but will also include temperatures which are above the safe operating temperature. Heretofore, temperature calibrations in this elevated region could not be safely realized, inasmuch as operation of the jet engine itself was required. With the present invention the jet engine cannot be damaged since only the thermocouples are subjected to heat.

From a comparison of the curves obtained, the observer can readily determine if the readings agree within predetermined tolerances. If there is an exceeding of the tolerances, adjustments are made in the circuit by varying the resistance of the leads of the aircraft indicator 42. Thus if the temperature indicator 42 is reading too low, as determined from the calibration chart, its reading may be increased by a judicious shortening of the leads. Conversely, if the temperature indicator 42 is reading too high, it may be corrected by lengthening the leads.

The ability to vary and control the temperature of the heating elements 11 by means of the auto-transformer 26 permits an alternate method of calibration to be used when it is desired to calibrate the temperature indicator 42 at a particular temperature. The temperature selected for calibration will generally be that which investigations on a particular propulsion unit have shown to be the safe operating temperature at 100 percent R. P. M., although the temperature could be set at any desired value within the range of the apparatus. With the input leads 28 and 29 of the auto-transformer 26 connected to its power source, the heating elements 11 placed firmly and securely over each of the thermocouples 32—35, and the movable contact arm 49 of switch 41 located in the calibrated potentiometer position, the variable tap 27 of the transformer 26 is set to a position, which from previous calibration data should produce the desired temperature at the thermocouples 32—35. After allowing the heat generated by the heating elements 11 to stabilize, the temperature indicated by the thermocouples 32—35 may be determined from the calibrated thermocouple potentiometer 45 and in the event that the particular calibration temperature desired has not been produced minor adjustments of the variable tap 27 of the auto-transformer 26 are made to bring the actual temperature as determined by the thermocouple potentiometer 45 and the desired temperature into coincidence. The movable contact arm 49 of switch 41 is then switched to its temperature indicator position and the temperature exhibited by the airplane's temperature indicator 42 is read. Should adjustment of the thermocouple system be required to bring the indications on the temperature indicator 42 and the calibrated thermocouple potentiometer 45 into agreement, proper alterations in the lead resistance from the thermocouples 32—35 to indicator 42 may be made until the indicator temperature is identical with the potentiometer reading.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What we claim is:

1. Apparatus for calibrating in situ an installed jet engine tail-cone thermocouple system having a temperature indicator; comprising a plurality of heating members in parallel circuit each adapted to be mounted upon one thermocouple of said thermocouple system and to supply heat thereto to simulate heating conditions generated in the operation of the jet engine, means in electrical circuit with said plurality of heating members for adjustably controlling current flow thereto, and a standard temperature indicator adapted alternately with said temperature indicator to be electrically interconnected with the thermocouples of the thermocouple system.

2. Apparatus for calibrating in situ an installed jet engine tail-cone thermocouple system having a temperature indicator; comprising a plurality of heating members in parallel circuit, each having a bore for receiving one of the thermocouples of the thermocouple system and adapted for mounting upon one of said thermocouples to supply heat thereto to simulate heating conditions generated in the operation of the jet engine, a heat controlling means in electrical circuit with said plurality of heating members for adjustably controlling current flow thereto, and a standard temperature indicator adapted alternately with said temperature indicator to be electrically interconnected with the thermocouples of the thermocouple system.

3. Apparatus for calibrating in situ an installed jet engine tail-cone thermocouple system having a temperature indicator; comprising a plurality of heating members in parallel circuit, each adapted to be mounted upon one thermocouple of said thermocouple system and to supply heat thereto to simulate heating conditions generated in the operation of the jet engine, an auto-transformer in electrical circuit with said plurality of heating members for adjustably controlling current flow to the heating members for determining their temperature, and a standard temperature indicator adapted alternately with said temperature indicator to be electrically interconnected with the thermocouples of the thermocouple system.

4. Apparatus for calibrating in situ an installed jet engine tail-cone thermocouple system having a temperature indicator; comprising a plurality of heating members in parallel circuit, each having a bore for receiving one of the thermocouples of the thermocouple system and adapted for mounting upon one of said thermocouples to supply heat thereto to simulate heating conditions generated in the operation of the jet engine, an auto-transformer in electrical circuit with said plurality of heating members for adjustably controlling current flow to the heating members for determining the temperature thereof, and a standardized temperature indicator adapted alternately with said temperature indicator to be electrically interconnected with the thermocouples of the thermocouple system.

5. Apparatus for calibrating in situ an installed jet engine tail-cone thermocouple system having a temperature indicator; comprising a plurality of heater elements in parallel circuit, said heater elements comprising a tubular heat conductive member and an electrical-resistance winding in surrounding relationship therewith, said tubular heat-conductive member adapted to be mounted upon a thermocouple of said thermocouple system and to supply heat thereto to simulate heating conditions generated in the operation of the jet engine, an auto-transformer electrically connected to said heater element circuit for adjustably controlling current flow to the heater elements for determining the temperature thereof, and standardized means for indicating temperature magnitudes adapted alternately with said temperature indicator to be electrically connected to the thermocouples of said thermocouple system.

6. Apparatus for calibrating in situ an installed jet engine tail-cone theremocouple system having a temperature indicator; comprising a plurality of heating members in parallel circuit, each heating member comprising a tubular member open at one end for mounting upon one of the thermocouples of said thermocouple system to supply heat thereto to simulate heating conditions generated in the operation of the jet engine, an electrical-resistance winding embedded in an insulating body having an opening therein within which said tubular member is fitted whereby said electrical-resistance winding is in surrounding relationship to said tubular member, an auto-transformer in electrical circuit with said plurality of heating members for adjustably controlling current flow thereto for establishing the temperature thereof, and calibrated means for indicating temperature magnitudes adapted alternately with said temperature indicator to be connected in circuit with the thermocouples of said thermocouple system.

7. Apparatus for calibrating in situ an installed jet engine tail-cone thermocouple system having a temperature indicator, the combination comprising heating means disposed in heat transfer relationship with at least one thermocouple of said thermocouple system, said heating means having a heat transfer capacity sufficient to simulate heating conditions congruent with the operating heat conditions of said tail-cone, a heat controlling means in electrical circuit with said heating means for adjustably controlling current flow thereto, and a standard temperature indicator for indicating the temperature of the thermocouple heated by said heating means.

8. Apparatus for calibrating in situ an installed jet engine tail-cone thermocouple system having a temperature indicator, the combination comprising heating means disposed in heat transfer relationship with at least one thermocouple of said thermocouple system, said heating means having a heat transfer capacity sufficient to simulate heating conditions congruent with the operating heat conditions of said tail-cone, a heat controlling means in electrical circuit with said heating means for adjustably controlling current flow thereto, and a standard temperature indicator for indicating the degree of heat transfer from said heating means to said thermocouple.

9. Apparatus for calibrating in situ an installed jet engine tail-cone thermocouple system having a temperature indicator, the combination comprising a plurality of heating members, in parallel circuit, each disposed in heat transfer relationship with a thermocouple of said thermocouple system, said heating members having heat transfer capacity sufficient to simulate heating conditions congruent with the operating heat conditions of said tail-cone, a heat controlling means in electrical circuit with said plurality of heating members for adjustably controlling current flow thereto, and a standard temperature indicator for indicating the degree of heat transfer from said heating members to said thermocouple.

References Cited in the file of this patent
UNITED STATES PATENTS

| Number | Name | Date |
|---|---|---|
| 1,206,304 | Chubb | Nov. 28, 1916 |
| 1,912,242 | Albert | May 30, 1933 |
| 2,277,365 | Michael | Mar. 24, 1942 |
| 2,494,863 | Dietz | Jan. 17, 1950 |
| 2,535,083 | Martin | Dec. 26, 1950 |
| 2,570,781 | Duerr | Oct. 9, 1951 |
| 2,595,814 | Rich et al. | May 6, 1952 |
| 2,658,380 | Evans | Nov. 10, 1953 |